United States Patent [19]

Earle

[11] 4,361,204

[45] Nov. 30, 1982

[54] HOT GAS VEHICULAR POWER SYSTEM WITH REGENERATION

[76] Inventor: John L. Earle, 2905 Crane St., Lemon Grove, Calif. 92045

[21] Appl. No.: 120,031

[22] Filed: Feb. 11, 1980

[51] Int. Cl.³ .............................................. B60K 3/02
[52] U.S. Cl. ..................................... 180/302; 60/408; 60/415; 180/68 R
[58] Field of Search ............ 180/302, 301, 303, 54 B, 180/54 A, 68 R, 54 R; 60/659, 370, 679, 408, 415, 412

[56] References Cited

U.S. PATENT DOCUMENTS

| | | | |
|---|---|---|---|
| 575,681 | 1/1897 | Clark | 180/302 |
| 862,375 | 8/1907 | Ayres | 180/302 |
| 1,006,063 | 10/1911 | Clarke | 60/408 |
| 1,269,492 | 6/1918 | Nagelmann | 180/302 |
| 1,360,122 | 11/1920 | Leidich | 180/302 |
| 1,380,795 | 6/1921 | Graziano | 180/302 |
| 1,904,611 | 4/1933 | Boyette | 180/302 |
| 1,932,698 | 10/1933 | Jose | 180/302 |
| 3,365,014 | 1/1968 | Clingerman | 180/54 R |
| 3,783,610 | 1/1974 | Gano | 60/628 |
| 3,980,152 | 9/1976 | Manor | 180/302 |
| 4,226,294 | 10/1980 | Latter et al. | 180/54 B |

*Primary Examiner*—David M. Mitchell
*Attorney, Agent, or Firm*—James C. Wray

[57] ABSTRACT

A motor vehicle is operated with a hot gas power system which includes a compressor which compresses air in normal driving when being driven by the motor and upon slowing or running down hill when being driven by vehicle momentum, a storage tank which holds the compressed air and a heat exchanger which cools the compressed air and supplies the removed heat to heat air as it is released from a storage tank to the motor. An additional heater is used where required. When required, fuel is added to the compressed air and the mixture is ignited and combusted before entering the motor.

13 Claims, 2 Drawing Figures

HOT GAS VEHICULAR POWER SYSTEM WITH REGENERATION

BACKGROUND OF THE INVENTION

Vehicles are conventionally operated with internal combustion engines which require large amounts of fuel and produce pollutants. The internal combustion engines require idling while vehicles are temporarily stopped which produces additional pollutants and wastes fuel.

Known external combustion engines require operation during idling and do not take advantage of power generations during certain modes of vehicle operations.

SUMMARY OF THE INVENTION

In the present invention an engine is operated by air that is compressed, stored in a storage tank, and heated prior to operating the engine. An engine uses one of its cylinders as a compressor to pump air into a storage tank in normal operation and as a vehicle is braking or going down a hill. Power for the motor is supplied when a sensor senses that air pressure in the storage tank drops to a low level.

Heat is applied to expand the air before it is passed through the motor, supplying energy to continue running the engine. Since the storage tank always contains some air pressure, the engine by compressing the air may also be used to pre-heat the air prior to its being sent through the heater to create greater thermal efficiency as the compressed air is sent through the motor.

A hot air engine uses air or any kind of hot gas. The engine has a compressor, a storage tank for compressed gas or air and a motor which is operated by the compressed air after being heated by external means. This type of engine is ideal for vehicles since it conserves energy by regenerative braking. The compressor is pumping air into the tank as the vehicle is being slowed or going down hill. Since an air storage tank is included which always contains some air pressure, it is not necessary to idle the engine when the vehicle is not in motion. Immediate response from the motor is obtained when the air under pressure is throttled into the air motor portion of the engine. Then, as the pressure in the tank drops, a sensor senses this and turns on the heat if necessary to expand the air before entering the motor portion of the engine.

Typical operating conditions use one cylinder of a four cylinder engine as the compressor and the other three as the motor. The air is heated after coming from the storage system, air volume is greater than that coming from the compressor. Three cylinders (approximately) consume the air compressed in the one cylinder compressor, if the air is heated about three times hotter than ambient air. Heat of compression is retained by running compressed air through a heat exchanger before it enters the storage tank. That heat is used to pre-heat the air before the heater just prior to the motor cylinders.

If a high temperature is attained in the heating it may be desirable to make the motor portion a turbine instead of a reciprocating engine, since reciprocating engines do not successfully run too hot and very hot air has been a problem in Stirling engines. The turbine avoids that problem, although it has other efficiency problems. Both forms of motor may be used.

Although the normal scheme is to use a compressor smaller than the motor, it is possible to use the compressor as a motor when the maximum power is desired for quick acceleration. Likewise, when descending a long hill, it may be desirable to convert all cylinders into compressors to store as much "free" air as possible rather than using the brakes, if the descent is steep.

The normal running condition keeps the tank at some nominal pressure somewhere between maximum pressure and ambient. Half the maximum is a desirable amount. Then, if descending a hill, air could be added and if climbing, there would be enough stored air to keep the engine running until enough heat was added to provide the additional power needed.

Pressure and temperature of the external combustion heater may be microprocessor controlled.

Since air is stored in an external tank, differing from normal Stirling engines that just recirculate it, valves are used as in a normal compressor and air motor. Additional valves are used on the air tank to save air when not operating the vehicle.

Additional benefits are that no storage battery is required since power is stored in the air tank. Cold starting is no problem. Dangerous batteries are eliminated. They can be retained if desired. A source of compressed air is provided for the vehicle for use in air conditioning directly without the use of freon. A small manual air compressor and small tank may be included in case for some reason the main tank ever gets depleted. Then, a person would never get stuck. Also, the air could be used for other purposes such as for inflating tires, etc. Air horns and other devices are readily available so that the only elecrical needs are for lights and radio, etc. This would reduce the alternator requirements and battery requirements, thus saving weight.

Another possibility is the use of liquefied air in the storage tank. Liquefied air could power a vehicle for some distance. So, the liquefied air from an alternative power system could be put into a vehicle tank, thus giving it a moderate range without the need of applying heat. Heat could be applied, if necessary, for long distances.

While one normally thinks of hot air engines as external combustion, the present system does not have to have external combustion. A constant high pressure is available for flowing to the motor. If a fuel is sprayed into this air stream and ignited, internal combustion results, but not with cyclic burning as in the normal gasoline engines. In the normal engine, ignition occurs thousands of times per minute, which makes it difficult to control the burning emissions. But, in the present system, with a steady stream of air at fairly constant pressure, the burner is well controlled and efficient. The fuel is completely burned before leaving the motor. This would then resemble a jet engine except that the jet engine uses a turbine compressor and no storage tank. A reciprocating compressor is preferable, since a relatively high pressure is desired for storage. However, if internal combustion is used as described, then preferably the motor would be a turbine to withstand the high temperatures. Again, since external combustion can be used, various fuels and solar heat easily may be employed.

To help cool the motor, compressor function may be shifted from one cylinder to the next every so many revolutions or every so often. This may be accomplished under microprocessor control if desired.

The use of the heat of compression to preheat the air to the air motor before the external combustion heater adds to the thermal efficiency.

A complete engine may have the compressor and motor portions in the same block. Using the basic hot air engine claimed with storage tank, one may sit at the stop light with the engine off and still start off like a rabbit. The engine allows rapid starts and still retains braking without consuming fuel and without violating laws against coasting.

Since the engine is not a four cycle reciprocating engine, but is a two cycle engine, and since it is a simple air compressor and motor, it is as smooth with four cylinders as a conventional engine is with eight.

An object of this invention is the provision of gas engine apparatus having a compressor, a storage tank connected to the compressor for storing compressed gas from the compressor, a motor connected to the storage tank for receiving compressed gas from the compressor and operating the motor, and a heat exchanger connected between the storage tank and the motor for heating compressed gas before the gas flows to the motor.

In a preferred embodiment, the heat exchanger includes a first heat exchanger between the compressor and the storage tank for receiving heat from compressed gas before it enters the storage tank and second heat exchanger connected between the storage tank and motor for releasing heat to gas as it passes from the storage tank to the motor and heat communication means for communicating heat from the first heat exchanger to the second heat exchanger.

Preferably the compressor is volumetrically smaller than the motor. Typically, the compressor is about one-third as large as the motor in working gas volume.

In one embodiment the compressor and motor are four cylinders. The first cylinder operates as a compressor, and the remaining three cylinders operate as a motor.

Preferably, the compressor compresses ambient air, the storage tank stores compressed air, and the motor receives compressed air from the storage tank and exhausts air.

Shut-off valves connected to the storage tank at an inlet thereof communicating with the compressor and at an outlet thereof communicating with the motor isolate the storage tank from the apparatus when the vehicle is not moving. A throttle valve positioned between the storage tank and the motor controlably releases compressed gas from the storage tank to the motor.

A vehicle driving means is connected to the motor for driving the vehicle by the motor. The driving means is connected to the compressor for driving the compressor.

Valves release air to the compressor, whereby the compressor operates as a motor, and separate valves connected to the motor selectively operate the motor as a compressor.

One object of the invention is the provision of a method for operating a motor vehicle including compressed gas, storing compressed gas in a tank, releasing compressed gas from the tank to drive a motor with the compressed gas and to drive a vehicle with the motor. In steady level driving, the motor operates the compressor. The vehicle operates the compressor when slowing and when running down hill. The motor is stopped when the vehicle is standing still and immediately starts when movement of the vehicle is desired. Valves connected to the storage tank are shut upon stopping the vehicle. A valve between the storage tank and the motor is opened when vehicle movement is desired.

Heat from between the compressor and storage tank is conducted to between the storage tank and motor. Compressed gas is cooled by the heat exchange prior to being stored and is heated by the heat exchange prior to being stored and is heated by the heat exchange prior to being supplied to the engine.

Power is augmented in one embodiment by adding fuel to the compressed gas between the storage tank and motor and igniting the fuel and compressed gas between the storage tank and motor and supplying combustion products of the ignited fuel and gas to the motor to drive the motor.

DETAILED DESCRIPTION OF THE DRAWINGS

Figure 1:
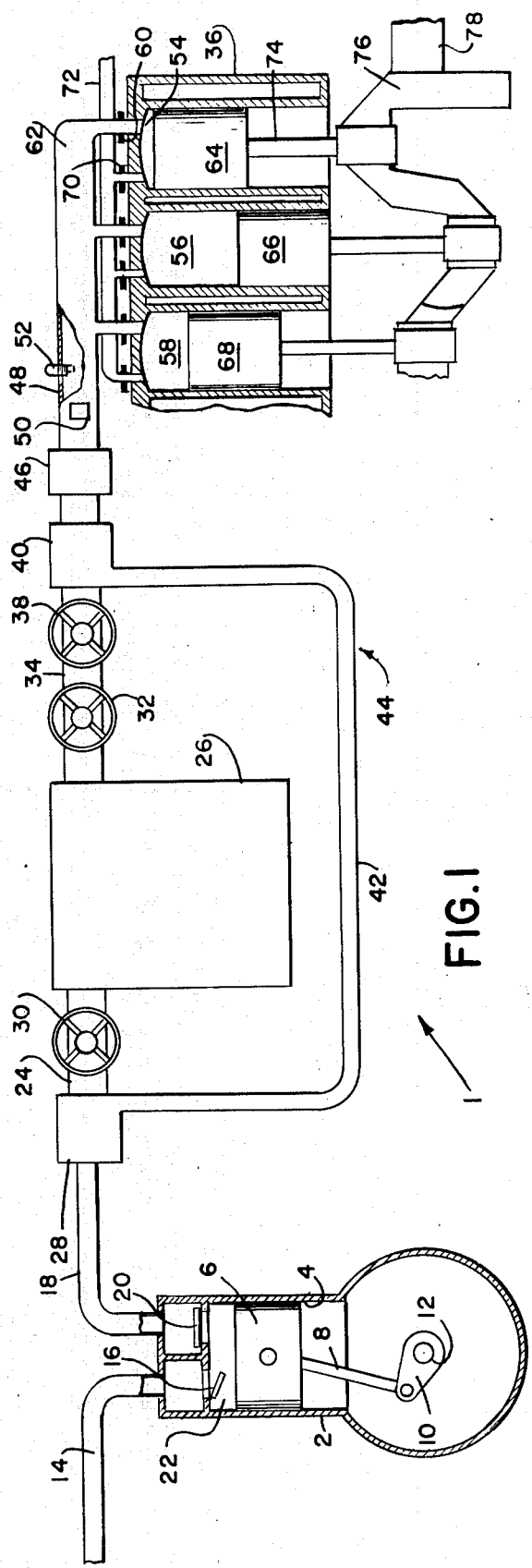
FIG. 1 is a schematic view of the elements of the invention.

Referring to FIG. 1, the power system of the present invention is generally indicated by the numeral 1. A compressor 2 has a cylinder 4 and a piston 6 which is coupled by a connecting rod 8 to a crank 10 on a drive shaft 12. Outside air from inlet 14 flows into the compressor through valve 16. In one embodiment, valve 16 is a check valve which allows flow of air into the compressor but prevents flow of air out of the compressor.

Compressor exhaust 18 has a valve 20. Valve 20 may be a check valve which releases air from compression chamber 22 when the pressure in chamber 22 becomes greater than the pressure in the compressor exhaust 18.

Air flowing through connecting pipe 24 between the compressor 1 and the air storage tank 26 passes through a heat exchanger 28 which will later be described. Valve 30 is closed when the power system 1 is stopped to prevent pressure loss from air storage tank 26.

Valve 32 is a similar shut-off valve in line 34 between the air storage tank 26 and motor 36. Valve 32 is shut off with valve 30 when the power system is stopped. Valve 32 also is shut off during charging of the air storage tank by the compressor, during regeneration when the motor is not needed.

Throttle valve 38 controls the flow of compressed air from the air storage tank to motor 36 when valve 32 is open.

Heat exchanger 40 receives heat from heat storage and conduction apparatus 42.

As the compressor compresses gas for storage in air tank 1, the gas becomes heated. It is desired to cool the gas before storage to increase the quantity of gas that may be stored. Heat exchanger 28 cools the hot compressed gas in conduit 24 and flows heat away from heat exchanger 28 into heat storage and conducting apparatus 42.

An example of a suitable heat conducting storage apparatus 42 may be a heat sink with insulated outer walls and with large surface areas such as expanded metal. The entire heat exchange apparatus including the storage and conducting apparatus 44 which includes the first and second heat exchangers 28 and 40 and the heat storage and conducting apparatus 42 may be filled with a fluid having desired heat storing and conducting characteristics.

When gas is released from storage tank 26 to flow through throttle valve 38 to motor 36, additional heat is desirable to counteract the cooling of the gas upon expansion and to increase the energy in the gas which is available to operate the motor.

In one embodiment of the invention, an augmenting heat exchanger 46 is supplied in conduit 34 to further add heat to the gas flowing to motor 36.

Heater 46 may be heated by external combustion.

In an alternative or augmenting form of the invention, fuel is sprayed into section 48 of conduit 34 by injection nozzle 50.

The fuel and compressed gas mixture is ignited by igniter 52 and the combustion products and excess compressed gas are flowed into motor 36.

As shown in FIG. 1, motor 36 includes three cylinders 54, 56 and 58. Valves 60 from intake manifold 62 are valves which are controlled to allow flow of hot gas into the chambers when pistons 64, 66 and 68 are near top dead center. Valves 60 are closed after an initial charge of hot gas is supplied to the chambers, whereupon the gas continues to expand, driving the pistons downward.

As pistons 64, 66 and 68 reach bottom dead center, appropriate exhaust valves 70 are opened so that the pistons force the expanded gas to the exhaust 72.

The pistons are connected by connecting rods 74 to cranks 76 of crank shaft 78. Crank shaft 78 may be an extension of crank shaft 12 and the compressor and motor cylinders may be positioned within the same block.

In one embodiment of the invention, valves 60 and 70 may be selectively convertible to check valves which allow flow from exhaust 72 through valves 70 into the chambers and out of valves 60 into header 62 so that the motor cylinders may operate as compressor cylinders when desired. In that embodiment, valve 32 may be opened to allow flow into storage tank 26 or valve 32 may be constructed as a check valve which permits flow into storage tank 26 when valve 32 is closed and which permits flow out of storage tank 26 only when valve 32 is open.

By rearranging valves 16 and 20, compressor 2 may operate as a motor in exceptional situations.

Figure 2:
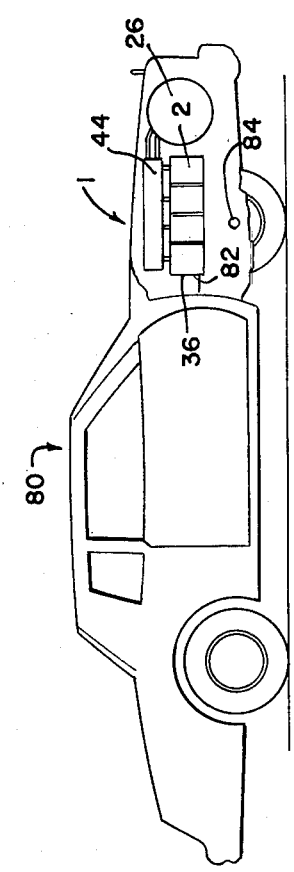
FIG. 2 is a schematic view of the elements in a vehicle.

As shown in FIG. 2, the power system 1 is mounted in a vehicle 80. Storage tank 26 is mounted adjacent engine block 82 which includes cylinders of motor 36 and compressor 2. A heat exchange apparatus 44 includes conduits which connect the compressor, storage tank and motor.

Pistons in motor 36 and the piston in compressor 2 are connected to a crank shaft which is in turn connected through gearing to drive axle 84. When the vehicle is deaccelerating or running down hill, valve 32 is closed and valve 30 is open.

Valves 60 and 70 are held open. Compressor 2 draws air in through valve 16, compresses the air and releases the air through valve 20 to storage tank 26. The heat of compression is partially withdrawn through heat exchanger 28 into heat storing and conducting apparatus 42.

When the automobile stops, valves 30 and 32 are shut off and nothing occurs. When one wishes to move the vehicle, such as when a light turns green, an accelerator is depressed. The action causes operation of devices which hold valve 16 and 20 open. Depressing the accelerator also opens valve 32 and controls the opening of throttle 38. Air from storage tank 26 flows through heat exchanger 40 picking up heat on its way to motor 36. Individual valves 60 open as respective pistons near top dead centers and remain for a brief period to fill the chambers. The filling and subsequent expansion of the compressed air with valves 60 closed drives the drive shaft and moves the vehicle.

Depressing the accelerator rapidly results in external heat being applied to heater 46 to further heat the air on the way to motor 36.

Extreme depression of the pedal causes fuel to be sprayed through nozzle 50 and causes igniter 52 to become operative, in one embodiment.

Alternatively, levers or switches may be provided to select external or internal combustion.

While the invention has been described with reference to specific embodiments, modifications and variations of the invention may be constructed without departing from the scope of the invention. The scope of the invention is defined in the following claims.

I claim:

1. Hot gas engine apparatus comprising a compressor, a storage tank connected to the compressor for storing compressed gas from the compressor, a motor connected to the storage tank for receiving compressed gas from the compressor and operating the motor and heater means connected between the storage tank and the motor for heating compressed gas before the gas flows to the motor, wherein the heater means comprises a first heat exchanger between the compressor and the storage tank for receiving heat from compressed gas before it enters the storage tank and second heat exchanger connected between the storage tank and motor for releasing heat to gas as it passes from the storage tank to the motor and heat communication means connected to the first and second heat exchanger for communicating heat from the first heat exchanger to the second heat exchanger.

2. The hot gas engine apparatus of claim 1, wherein the compressor and motor comprise plural cylinders in a single block, the total volume of cylinders operating as a motor exceeding the total volume of cylinders operating as a compressor.

3. The hot gas engine apparatus of claim 1 wherein the compressor is volumetrically smaller than the motor.

4. The hot gas engine apparatus of claim 3 wherein the compressor is about one-third as large as the motor in working gas volume.

5. The hot gas engine apparatus of claim 1 further comprising a vehicle having mounting means for receiving the motor and having driving means connected to the motor for driving the vehicle by the motor, the driving means being connected to the compressor for driving the compressor.

6. The hot gas engine apparatus of claim 1 wherein the compressor has an air intake and compresses ambient air, and wherein the storage tank stores compressed air and wherein the motor has intake means for receiving compressed air from the storage tank and has exhaust means for exhausting air.

7. The apparatus of claim 1 further comprising shut-off valves connected to the storage tank at an inlet thereof communicating with the compressor and at an outlet thereof communicating with the motor, whereby the storage tank may be isolated from the apparatus by the shut-off valves when the vehicle is not in use.

8. The hot gas engine apparatus of claim 7 further comprising a throttle valve positioned between the storage tank and the motor for controlably releasing compressed gas from the storage tank to the motor.

9. The method of operating a motor vehicle comprising compressing gas, storing compressed gas in a tank, releasing compressed gas from the tank to a motor and driving a motor with the compressed gas and driving a vehicle with driving means operated by a motor, and further comprising conducting heat from between the compressor and storage tank to between the storage tank and motor whereby compressed gas is cooled by the heat conducting prior to being stored and is heated by the heat conducting prior to being supplied to the engine.

10. The method of claim 9 comprising compressing gas in a compressor driven by the driving means when the vehicle is slowing and when running down hill.

11. The method of claim 9 further comprising stopping the motor when the vehicle is standing still and immediately starting the motor when movement of the vehicle is desired by shutting off valves connected to the storage tank upon stopping the vehicle and by opening a valve between the storage tank and the motor when vehicle movement is desired.

12. The method of claim 9 further comprising adding fuel to the compressed gas between the storage tank and motor and igniting the fuel and compressed gas between the storage tank and motor and supplying combustion products of the ignited fuel and gas to the motor to drive the motor.

13. The method of claim 9 wherein the gas is heated prior to entering the motor.

* * * * *